United States Patent [19]

Wilhelm

[11] Patent Number: 4,830,792

[45] Date of Patent: May 16, 1989

[54] VORTEX-INDUCING PACKING OF PYRAMID-TYPE ELEMENTS AND PROCESS FOR ITS ASSEMBLY

[76] Inventor: Gerd Wilhelm, Gerhart-Hauptmann-Weg 6, D-4040 Neuss 21, Fed. Rep. of Germany

[21] Appl. No.: 12,876
[22] PCT Filed: Apr. 25, 1986
[86] PCT No.: PCT/DE86/00175
§ 371 Date: Dec. 23, 1986
§ 102(e) Date: Dec. 23, 1986
[87] PCT Pub. No.: WO86/06296
PCT Pub. Date: Nov. 6, 1986

[30] Foreign Application Priority Data

Apr. 27, 1985 [DE] Fed. Rep. of Germany ....... 3515300

[51] Int. Cl.$^4$ .................................................. B01F 3/04
[52] U.S. Cl. ............................. 261/79.2; 261/DIG. 72
[58] Field of Search .................... 261/DIG. 72, 79.2

[56] References Cited

U.S. PATENT DOCUMENTS

| | | | |
|---|---|---|---|
| 2,594,585 | 4/1952 | Ridgway, Jr. | 261/DIG. 72 |
| 2,779,724 | 1/1957 | Dunning et al. | 261/79.2 |
| 3,010,706 | 11/1961 | McWilliams | 261/DIG. 72 |
| 3,233,981 | 2/1966 | Scott | 261/DIG. 72 |
| 3,295,840 | 1/1967 | Donald | 261/DIG. 72 |
| 3,804,387 | 4/1974 | Brinzei et al. | 261/79.2 |
| 4,022,596 | 5/1977 | Pedersen | 261/DIG. 72 |
| 4,496,498 | 1/1985 | Pluss | 261/DIG. 72 |
| 4,497,752 | 2/1985 | Huber | 261/DIG. 72 |
| 4,541,967 | 9/1985 | Masaki | 261/DIG. 72 |
| 4,675,103 | 6/1987 | Nadudvari et al. | 261/DIG. 72 |

FOREIGN PATENT DOCUMENTS

| | | |
|---|---|---|
| 0063729 | 1/1987 | European Pat. Off. . |
| 318889 | 2/1920 | Fed. Rep. of Germany ... 261/DIG. 72 |
| 3110859 | 1/1982 | Fed. Rep. of Germany . |
| 645665 | 2/1979 | U.S.S.R. ............................. 261/79.2 |

Primary Examiner—Tim Miles
Attorney, Agent, or Firm—Herbert Dubno; Ronald Lianides

[57] ABSTRACT

A column packing has a multiplicity of generally horizontal superposed layers each of which is provided with adjacent pyramidal formations with open pyramidal sides so that at alternating junctions, the flow through the packing layer receives a rotational impetus in opposite senses. The vectoral sums of the rotation cancel out although the local vorticity ensures intimate mixings of the fluids. The pyramids may have triangular, square or rectangular bases and the apexes of an adjacent layer may coincide with the junctions of the bases of the next layer.

7 Claims, 7 Drawing Sheets

VORTEX-INDUCING PACKING OF PYRAMID-TYPE ELEMENTS AND PROCESS FOR ITS ASSEMBLY

CROSS REFERENCE TO RELATED APPLICATIONS

This application is a national phase application of PCT/DE86/00175 filed Apr. 25, 1986 and based, in turn, upon a German National application P35 15 300.8 filed Apr. 27, 1985 under the International Convention.

1. Field of the Invention

My present invention relates to a packing material for heat exchange and mass exchange columns.

2. Background of the Invention

Thermal mass exchange processes, such as absorption, distillation and extraction are generally carried out in installations with vertical columns.

In order to achieve the largest possible contact surfaces between the interacting phases, inserts are mounted in these columns to create a large exchange surface to ensure a high degree of uniformity of distribution of the fluid phases in each horizontal cross-section of the column, to provide a low flow resistance, and to reduce manufacturing and mounting costs.

In order to provide the contact surfaces for the phases in a mass-exchange apparatus, the inserts can be exchange bottoms mounted at distinct places, or so-called filler bodies or packings, which are supposed to pack the interior of the column uniformly.

According to their arrangement, these filler bodies can either be a randomly piled bulk material or a packing structured according to certain rules. A randomly piled bulk material can use Raschig rings, Pall rings, Bialecki rings and the like (see BILLET, R., *Industrial Distillation*, ISBN 3-527-25371-8, Page 95, Page 263; and BILLET, R., *Energy Savings in Thermal Separation Processes*, ISBN 3-7785-0912-8, Pages 61, 140 and 183).

In random-like bulk materials consisting of such filler bodies, it cannot be avoided that in the interior of the column and particularly at its border, there will be considerable maldistributions of the filler bodies whereby channels or rivulets are formed in the flowing phases. Considered over the cross section, the mass flow of the fluid phases are also distributed unevenly, and this is the reason for an impaired separation efficiency of the column.

Among the geometrically regular packings used in mass-exchange installations are packings marketed by the firms of MONTZ, SULZER and RASCHIG, and inserts known as grid packings or impulse packings, as well as expanded-metal packings, and structured packings made of the above-mentioned bulk-material elements (for instance, Bialecki rings) (see *Industrial Distribution*, op. cit. and *Energy Savings*..., op. cit., Pages 62, 145 to 153, 183, 247, 350 to 353).

Geometrically regular packing assemblies can also have the disadvantage of channel formation as in randomly piled bulk material. The separation efficiency can be impaired particularly in the cases of mass-exchange between a gas (steam) and a liquid and even a slight irregularity in the liquid delivery at the top end of the column cannot be corrected in the further flow of the liquid, since a cross-mixing between the down-flowing liquid streamlets does not occur.

This problem becomes more acute in the case of relatively small liquid streams, such as are common in vacuum rectifications or in absorption processes. Under such circumstances, vertical packings with axially parallel alignment are particularly susceptible of impaired mass-exchange processes. In *Industrial Distillation*, op. cit., Page 171 and in *Energy Savings*..., op. cit, Page 147, there are illustrations of an expanded-metal packings and in the latter reference, Page 183, there are illustrations of impulse packings and a Bialecki packings which have an axially parallel flow with the disadvantage of limited cross-mixing. It is known that these packings have a low separation efficiency.

Other packings try to avoid this disadvantage by forming flow channels which are inclined with respect to the vertical axis of the column, such as is the case, for instance, in the SULZER- and MONTZ-packings, (see the illustration 4.34, Page 145 bottom, illustration 4.39, Page 150 and illustration 4.40, Page 151 of *Energy Savings*..., op. cit.).

The grid packing (*Energy Savings*..., op. cit.) is structured vertically with respect to the column axis. Each layer has a certain alignment with the course of the geometrical recesses and projections. Through these structures of the SULZER and MONTZ as well as of the grid packings and others, the components of the liquid flow are generally perpendicular to the main flow direction in each layer and are not uniformly radially distributed. In the previously mentioned packings, it has been attempted to compensate for drawbacks by modifications using layers or blocks of the packing structure, but this can be done only with increased manufacturing and assembly costs.

Further, there are packings which basically preserve the axially parallel flow in columns, but which provide a zig-zag path, (see KULBE et al, *Chem. Techn.*, 34th year, volume 5, May '82, Page 236 and illustration 1). The DD 200 608/1 and the DE OS 29 43 061 are related to this work. Although allegedly here also pyramid-like elements are used for packing, these packings are essentially different in their structure and the way they work from that of the invention subsequently described as will be apparent.

OBJECTS OF THE INVENTION

It is an object of the invention to provide an improved packing which avoids the formation of channels in the flow of the phases participating in the exchange, has an elevated separation efficiency and uniform distribution of the flow of substances over the horizontal cross section, and does not confer a preferred direction, but distributes these evenly over all directions at the plane of an insert.

It is also an object to provide for a simple fabrication and easy assembly of a packing.

SUMMARY OF THE INVENTION

This object can be attained by affixing small projections or recesses, for instance with a shape of pyramids with totally or partially open sides, to form a grating extending across the cross section of the column and structured uniformly in a pattern of simple, generally plane figures, so that two different fluid phases can also pass in countercurrent through the openings and can be subjected to moderate deviations with respect to the main flow direction due to the inclined orientations of the edges and sides of the pyramids and with respect to the axis of the column, these deviations canceling each other completely or almost completely in their vectoral sums, in each considered cross section. A stack of such gratings extends over the height of the column.

Therefore, it is a characteristic feature of this packing that each of the neighboring partial surfaces of the relief-patterned structure of a cross-section layer forms a rigid fanlike arrangement of sheet metal deflectors or deflecting planes, which deflect the current-forming media in the column approximately evenly in all directions in a cross section with respect to the direction of the main current, mixing neighboring and oppositely directed flows with each other.

SPECIFIC DESCRIPTION

Figure 1:
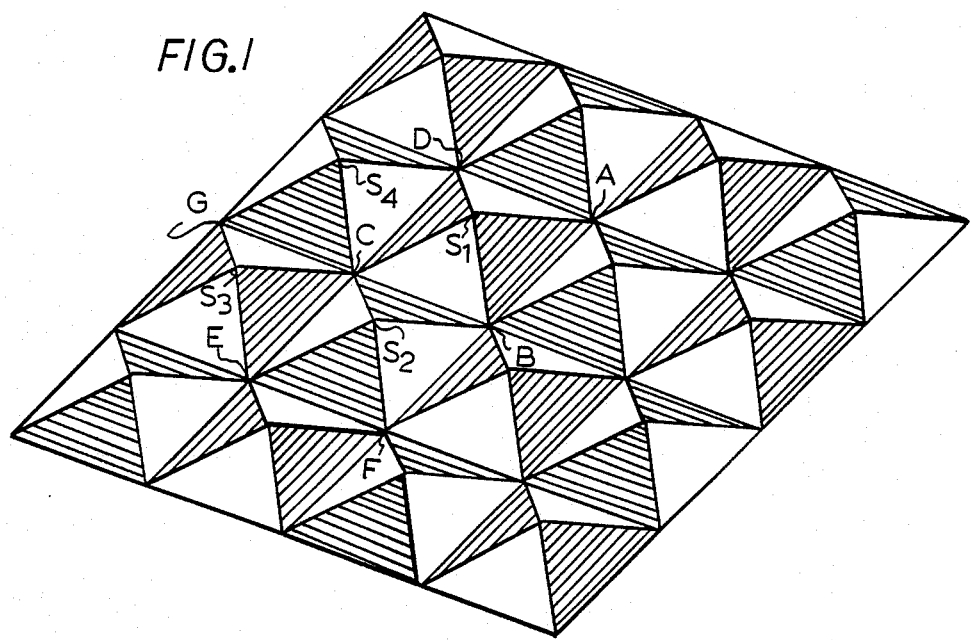
FIG. 1 is a diagrammatic perspective view showing the basic structure based on a pattern of regular quadrilateral pyramids.

In the packing of FIG. 1, the bases of the pyramid of one layer are squares.

A typical pyramid will have a base defined by the points A, B, C and D and which is open. The base edges are AB, BC, CD and DA for this pyramid and BC, CE, EF and FB for an adjacent pyramid with apex $S_2$.

Figure 2:
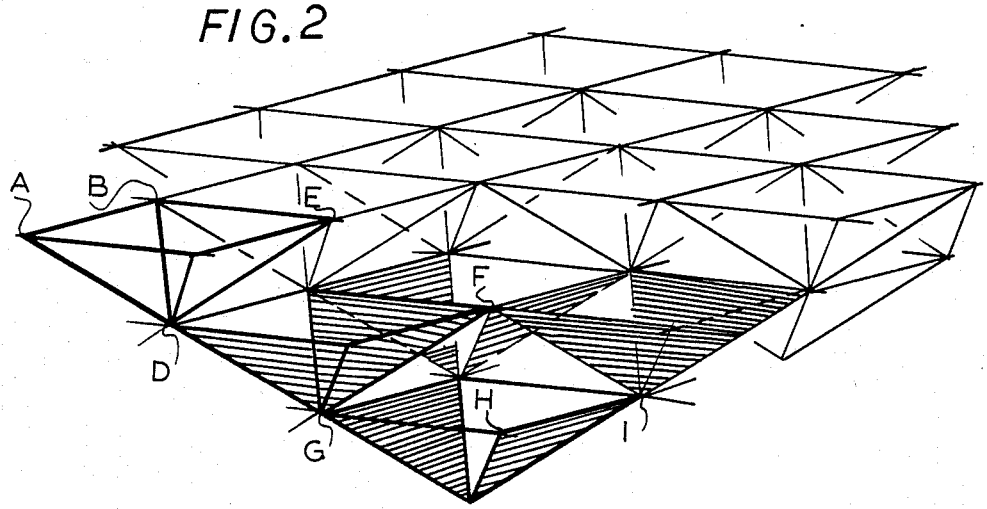
FIG. 2 is a perspective view of a development of FIG. 1 according to the invention and consisting of several layers wherein on opposite sides of the pyramid respectively, passing-through surfaces or windows are available and the full sides of the pyramid are oriented in the same direction.

C is a junction between pyramids with apexes $S_1$, $S_2$, $S_3$ and $S_4$. Around each junction point, e.g. the junction point C, for example, the open sides of the pyramids $CDS_4$, $CGS_3$, $CES_2$ and $CBS_1$ alternate with similarly inclined walls $CS_1$, $CS_4G$, $CS_3$ and $CS_2$ to define the fins of a stationary blade structure imparting a rotation to the flow, assuming it is rising from below the layer in a clockwise sense. At the junction B alternating with the junction C or the junction E alternating therewith, a counterclockwise flow will be induced so that, while local vorticity is induced, the vectoral sum of the rotations will cancel out. The points A, B, C in FIG. 2 mark the corner points of a base in a plane horizontally extending across a column. The squares are contiguous. Over each square, a regular pyramid is erected, whose apex, in this case, is pointing downwards. The apexes of the pyramids in one plane are located at the base-corner points of the squares defining the next lower plane. In FIG. 2, the points, D, E, F lie in this next lower plane. The points G, H, I lie in the next plane following in downward direction. The construction of each plane is identical. The successive planes are as described, offset with respect to each other. From each edge of the square basic grating, only one filled or solid pyramid surface extends. Some surfaces are indicated by shading in FIG. 2.

Figure 3:
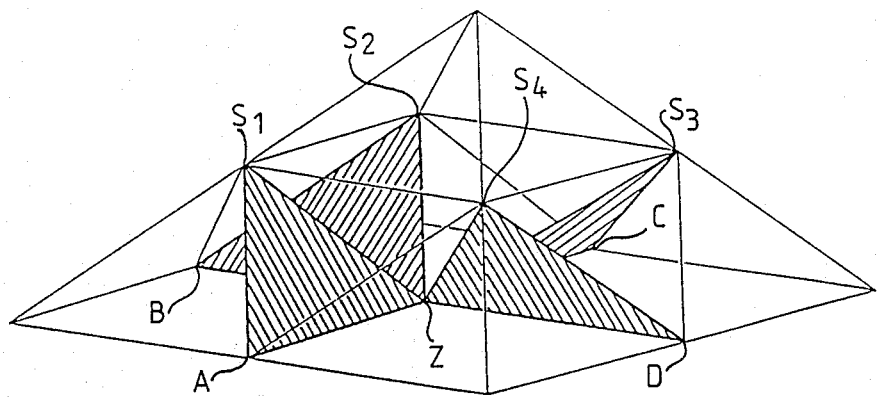
FIG. 3 is a perspective detailed view of four neighboring pyramid sides from FIG. 2 showing how they constitute a rotor-like arrangement.

If this characteristic feature of the embodiment in FIG. 2 is considered then, over the entire packing, rigid fanlike arrangements consisting of pyramid sides with different senses of rotation of through-flowing fluid are distributed. One such arrangement is shown in FIG. 3 which is a detail of FIG. 2. In FIG. 3, Z is a junction point of four adjacent filled pyramid surfaces, namely the walls $ZAS_1$, $ZBS_2$, $ZCS_3$ and $ZDS_4$. The advantageous performance of this preferred embodiment of the packing is described with the aid of the FIGS. 4 to 6.

This embodiment is based on square grating elements of the base plane and on pyramids uniformly erected thereon, whose lateral sides, as shown in FIG. 2, are alternately closed (full) and open. Since the base surfaces of the pyramids remain also open, no essential narrowing of the cross section in which the packing is inserted occurs. This way, a pressure loss in the circulating media due to sudden changes in the tube cross section can be avoided.

The lateral surfaces of the pyramids at an average thickness of the packing material occupy only 1 to 2% of the cross section surface. In spite of that, a free, almost axially parallel and rectilinear path of the current is made impossible. The protection surface of only one single layer of the packing covers the free cross section already up to 50%, as can be seen from FIG. 4.

Figure 4:
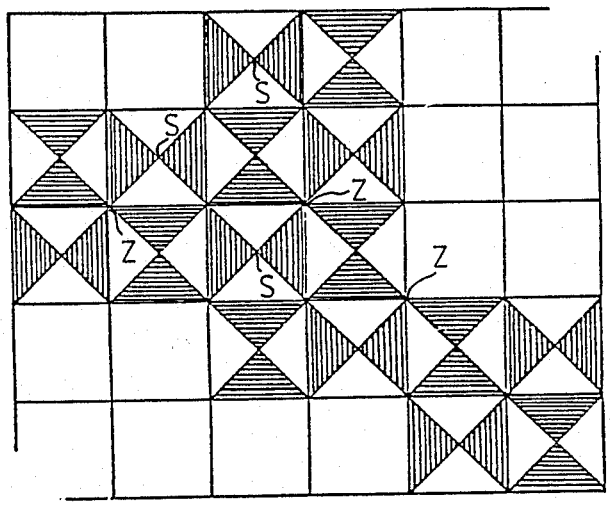
FIGS. 4 and 5 are top views of two consecutive layers of a preferred embodiment of the packing according to FIG. 2.
Figure 5:
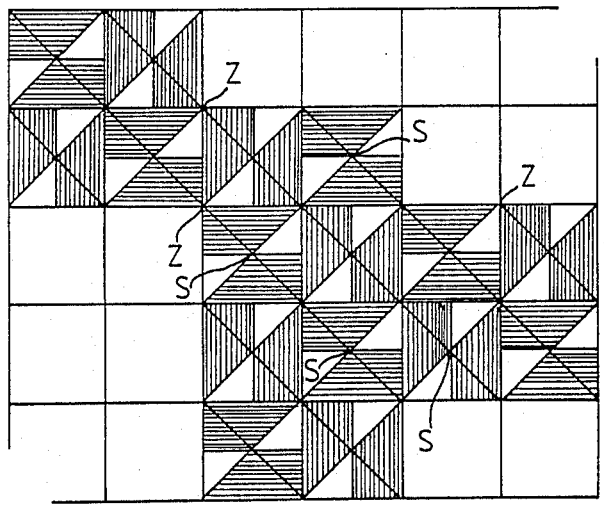

In FIGS. 4 and 5, the points Z are junctions of filled pyramid surfaces and points S are apexes of the pyramids. The points Z lie in one plane and the points S lie in the next higher plane. If the two layers are superimposed in accordance with their purpose of use, the free portion of the projection surface amounts only to 25%, as is shown in the representation of FIG. 5. Through only three layers, the projection surface of the packing on the cross section is almost closed.

Thus the media flowing through a tubular body in direct or counter current can be intensively deflected by the described packing with only minimal changes in the free cross section, which undoubtedly enhances the contact of the fluids involved in the exchange.

Figure 6:
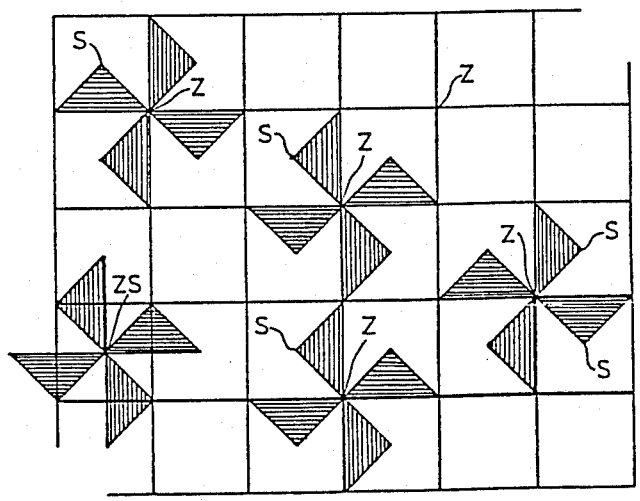
FIG. 6 is a top view of rotor-like arrangements of pyramid sides in an embodiment according to FIG. 2.

If one looks again at a single-layer element, a heat and mass exchange packing with a square base pattern captures in one glance, the corner point of four converging base squares lying in the plane of the cross section, namely, the points Z in FIG. 6. It can be noted that four lateral surfaces of adjoining pyramids come together to form a four-blade, propeller-like immobile rotator for the fluid. Not considering the border layers, each of these corner points of a basic square is the center of such a small fan. The flow encountering such a fan wheel are thereby set in rotation.

It is surprising, not considering the borders of the layers, that the number of fan wheels imparting a clockwise rotation is equal to the number of fan wheels imparting a counterclockwise rotation to the flow.

FIG. 6 which diagrammatically illustrates this phenomenon, shows the highlighted elements of a layer in a top view. It is to be noted that the centers Z of the fan wheels are located in a plane other than the apexes S of the lateral surfaces of the pyramids. These packing inserts serve not only as deflectors for the flowing media, but surprisingly they also cause a rotating effect of the phases in contact, whereby also cross-mixing occurs within the same phases. In the neighboring layer, the centers Z are offset towards the apex S of the pyramids of the originally considered layer. At each apex S, the center ZS of the neighboring layer is created, see FIG. 6.

The advantage of the packing made of pyramid-type elements resides primarily in the uniform cross exchange of the fluid phases and thereby in the process characteristics. A portion of the media flowing in direct or countercurrent are deflected into further flow directions by the pyramid edges themselves or by the surfaces they form. On each apex of a pyramid, there is an intersection point, wherefrom convergent partial streams of a phase can be redistributed and again influenced as to their directions of flow, so that in addition to the deflection of the currents transversely to the axis of the flow channel, a mixing process occurs. This results in a uniform separation. A pressure loss occurring, for instance, in a gas flow can be kept at a minimum due to the rounded configuration of the pyramidal base structure. The sides of the pyramids, as far as they are closed either partially or completely, offer to the downpouring liquid the possibility to spread and to create large exchange surfaces. The horizontal spreading of the downwards flowing liquid can be assisted by horizontal corrugations. The lateral surfaces of the pyramids can also be made of textile and metal cloth. The horizontal deflections of the axially parallel currents do not receive any specific direction, when considered over the entire cross section of one layer of packing; in a horizontal cross section, they are very evenly distributed in all directions. Particularly, the flow towards the boundaries of the layer is in no way favored, as is the case in many of the other state of the art packings.

The surprisingly good effect on the separation of soluble mixtures could be established in rectification tests with the mixture of 1,2-dichloroethane and toluene. The packing used was assembled as in FIG. 2. The side of the square base of the elementary pyramid had a length of 20 mm, the diameter of the column was about 100 mm and the height of the packing consisting of 28 superimposed layers amounted to 304 mm. The rectification tests were carried out under total reflux of the condensed vapor.

EXAMPLE 1

The heating in the column's sump was set so that the velocity of the ascending mixture vapor, in relation to the clear column cross-section, in the measured section in the medium, was 0.41 m/s and the composition of the liquid flow changes from 31.8 mole % below the test section of 61.0 mole % 1,2 dichloroethane above the test section.

EXAMPLE 2

The test arrangement was not changed with respect to Example 1, except for the heating. It was set so that the velocity of the mixture vapors in the measured section in the medium was 1.23 m/s. The composition of the liquid flow below the test section was found to be 34.7 mole % and above the test section 66.4 mole % dichloroethane.

When considered in relation with 1 mm of column height, the separation coefficient (in terms of the number of theoretical stages) can be established from the concentration data, in the case of the first example at $n_t = 4.9$ and in the case of the second example at 5.3 $m^{-1}$.

Further advantages of the packing assembly, particularly the preferred embodiment according to FIG. 2, reside in the manufacturing and in the assembling process. In accordance with the kind of packing material used, different manufacturing processes can be considered, as for instance, for synthetic materials, casting for easy-meltable metals, for instance, aluminum alloys.

Figure 7:
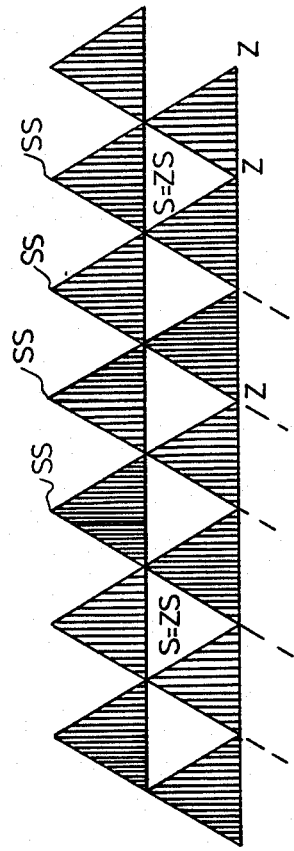
FIG. 7 is a developed view and FIG. 8 an elevation showing a tilting of a stamped sheet-metal strip, wherefrom the embodiment according to FIG. 2 can be constructed.
Figure 8:
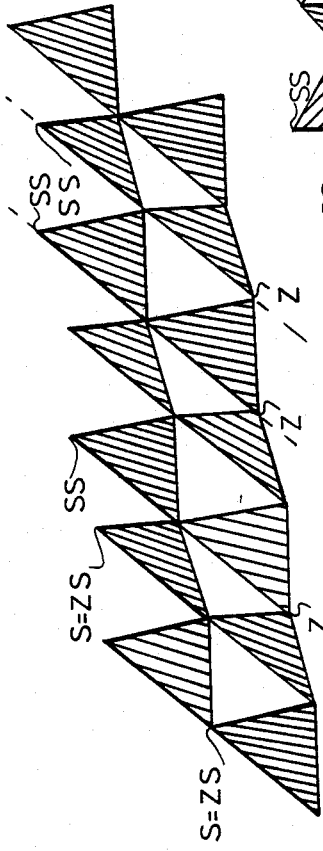
Figure 9:
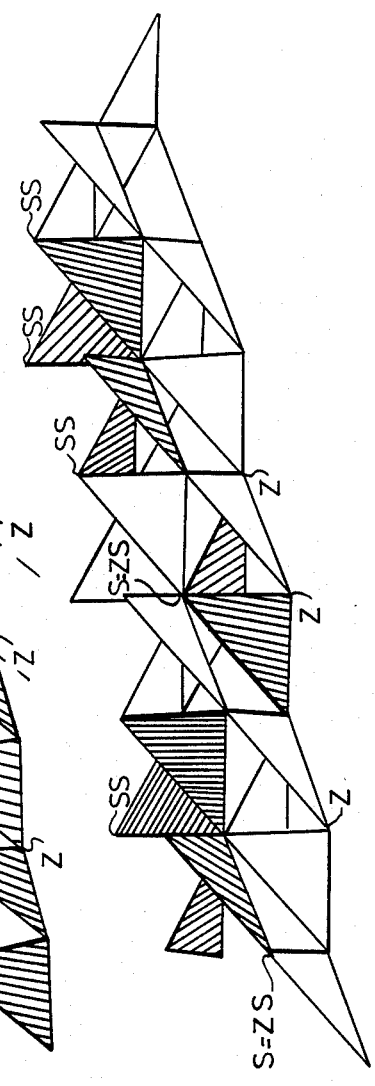
FIG. 9 is a perspective view of sheet-metal pieces attached to each other processed according to FIGS. 7 and 8, for the assembly of the embodiment according to FIG. 2.

In the case of thin-walled materials, particularly sheet metal, a simple manufacturing process can be established according to the invention, when for the packing assembly according to FIG. 2, strips of sheet metal according to FIG. 7 are punched out and folded along the dotted line, so that a spatial structure results, as illustrated in FIG. 8. By joining together of sheet metal strips produced this way, a double layer of the packing according to FIG. 2 can be built, as illustrated in FIG. 9. FIG. 9 comprises, as has been highlighted for one of the two illustrated layers, a pyramid consisting of two oppositely located pyramid sides, and in the other layer, two fanlike vortex-creating bodies, consisting each of four pyramid sides meeting with each other at one point. In FIGS. 7-9, Z are the points of the lower plane of a layer and S are the points of the upper plane of the same layer; the points S are simultaneously the points ZS of the lower plane of the following layer ad the points SS are the points of the apexes of this following layer.

Figure 10:
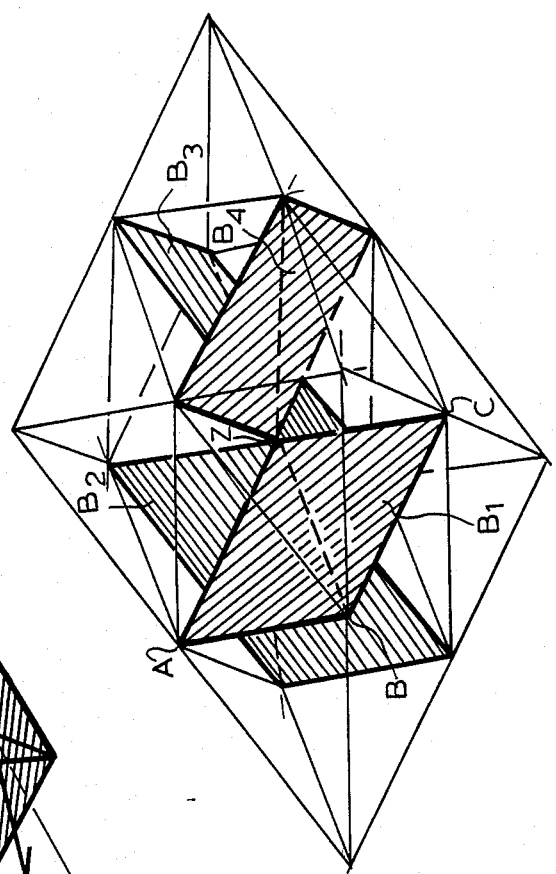
FIG. 10 is a similar view of a further embodiment with partially closed pyramid surfaces, wherein the closed sides of neighboring pyramids meeting each other at the apex of the pyramids do not constitute a level surface.

A variation of the packing structure of the kind according to FIG. 2 is created when the pyramid apexes of the two layers are superimposed in a double layer, and such double layers succeed one another. In FIG. 10, the arrangement is such that the closed sides of adjacent pyramids, for example, ABS and EFS, converging at the pyramid apexes S do not create a plane surface; the square base gratings of the two double layers, for example, ABCD and EFGH, are preserved this way and are congruent with each other.

Figure 11:
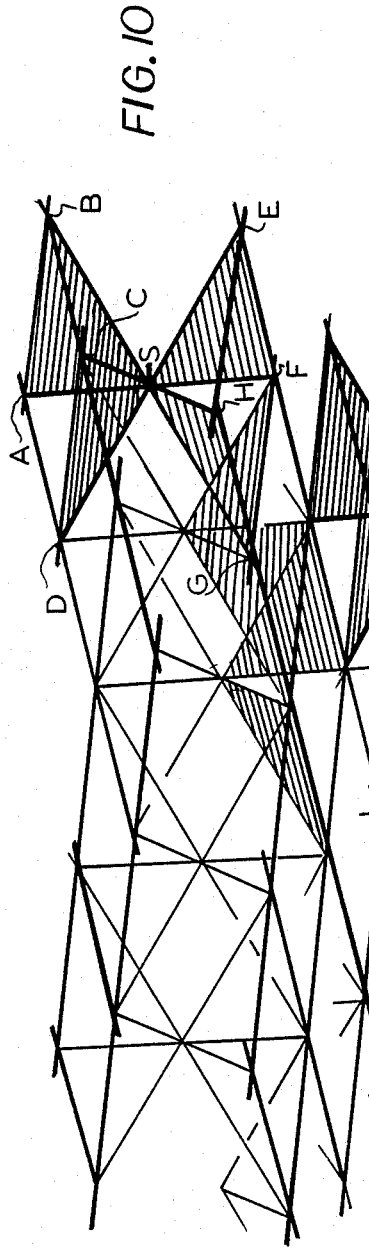
FIG. 11 is a detail view from FIG. 10 of eight neighboring pyramid sides, each two of which form a level surface for a rotor-like arrangement.

In a further preferred embodiment, the double layers can be superimposed in such a manner that pyramid sides of the contiguous double layers each form a plane surface. This way, according to FIG. 11, vorticity-creating bodies again with four deflection baffles, namely, $B_1$, $B_2$, $B_3$ and $B_4$, result, each consisting of two pyramidal lateral surfaces joined together, for example, deflection baffle B₁ consists of two joined pyramidal sides BAZ and ZCB. In FIG. 11, four such baffles are highlighted by shading. In this arrangement, a suitably selected double layer is already largely closed in the vertical projection which makes difficult any straight-light flow of fluid over several layers. Also in the arrangement, according to FIG. 10, disregarding boundaries of the layers, there is an equal number of each clockwise and counterclockwise-acting deflector baffles, e.g. of so-called vorticity-creating bodies, with their rotating and cross-mixing influences on the currents in the column, respectively channel.

Figure 12:
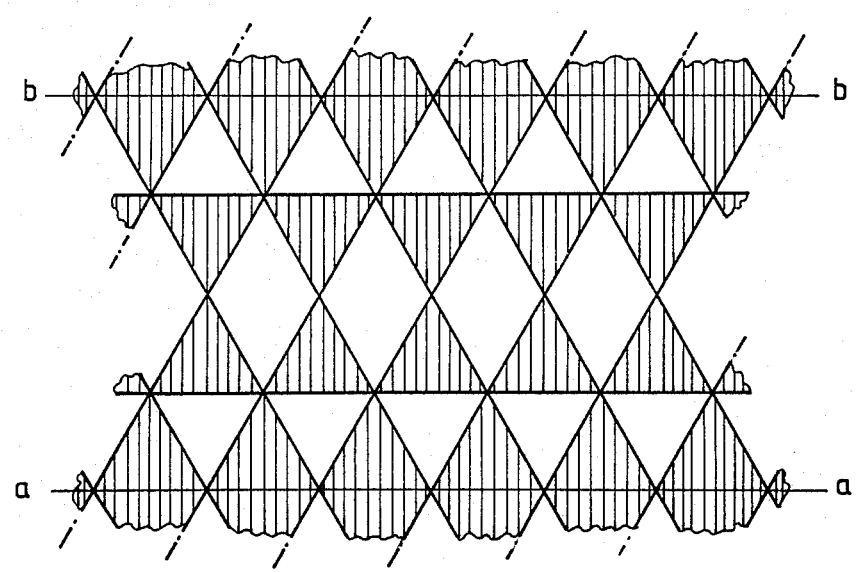
FIG. 12 is a developed view of a stamped sheet-metal indefinitely expanded, wherein the sequence between the section a—a and b—b repeats itself, for the assembly of the embodiment of FIG. 10.

According to the invention, the packing sketched in FIG. 11 can also be assembled from stamped and bent sheet-metal pieces, and, namely, analogously to the manner shown in FIGS. 7 to 9, for the packing according to FIG. 2. In the case of the packing shown in FIG. 11, sheet metal surface of desired size can be used, which is punched out according to FIG. 12 and wherein the stamping pattern defined between the marking lines a—a and b—b repeats itself continuously.

Figure 13:
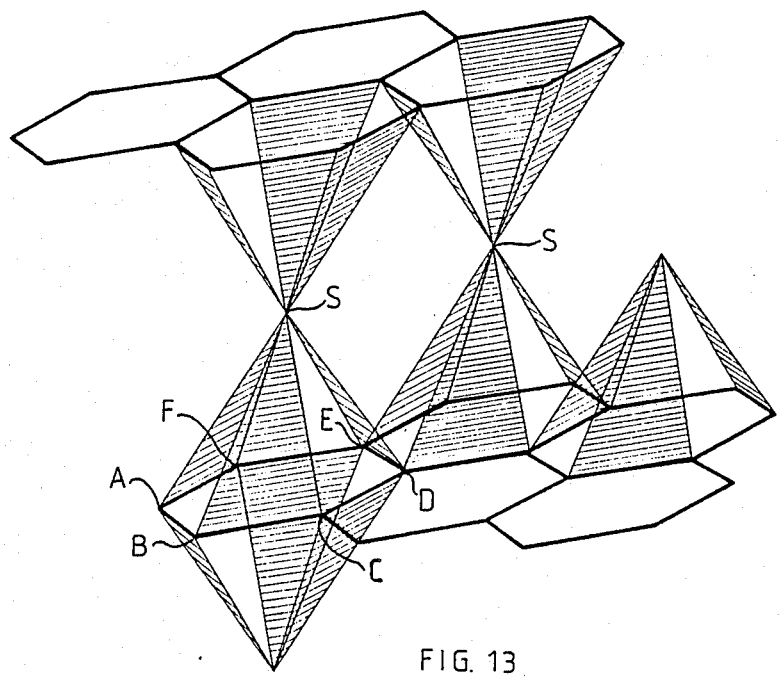
FIG. 13 is a perspective view of a packing based on regular hexalateral pyramids.

In an analogous arrangement, the here-discussed phenomena, sketched in FIGS. 10 and 11, can be found also in a hexagonal structure, which is to be considered as a preferred embodiment, just like the one with the square grating. For instance, in FIG. 13, a regular hexagon, e.g. ABCDEF, is the element os a plane base structure. On each hexagon, two pyramids are erected, one pointing upwards, the other pointing downwards. Pyramid apexes of neighboring layers rest respectively on each other. The pyramids can again be alternately completely closed or partially closed.

Figure 14:
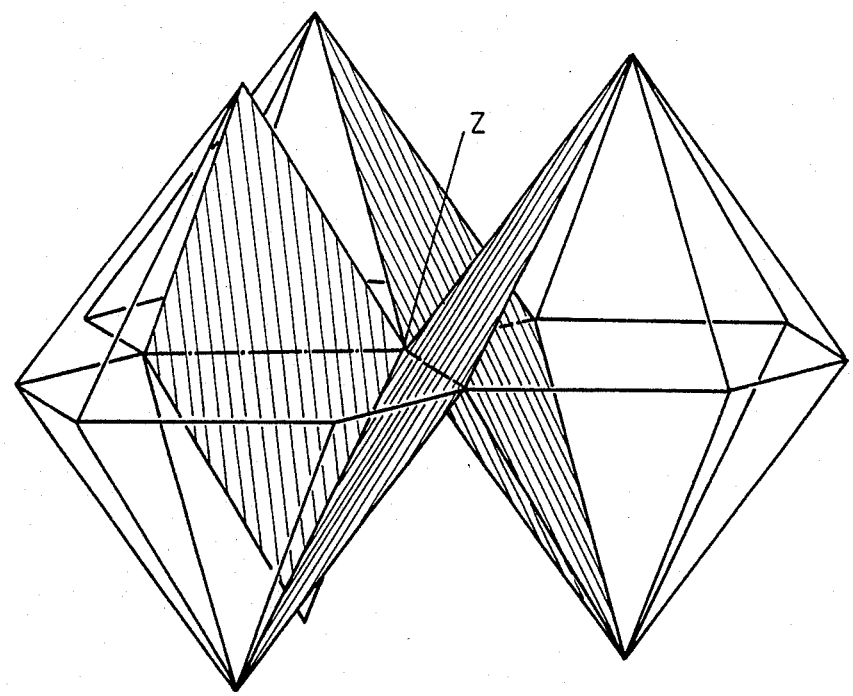
FIG. 14 is a detail view from FIG. 13, with the representation of six pyramid sides, each two of which form a level surface, for a rigid fan-blade arrangement.

To the grating plane of the hexagons, lateral surfaces of the pyramids can also be joined in such a manner as to create double-layer vorticity-creating bodies, as shown in FIG. 14. The points Z mark the meeting point of the pyramid sides, constituting a fanlike arrangement. The vertical projection of the two packing layers between two grating levels, FIG. 13, is closed again.

Figure 15:
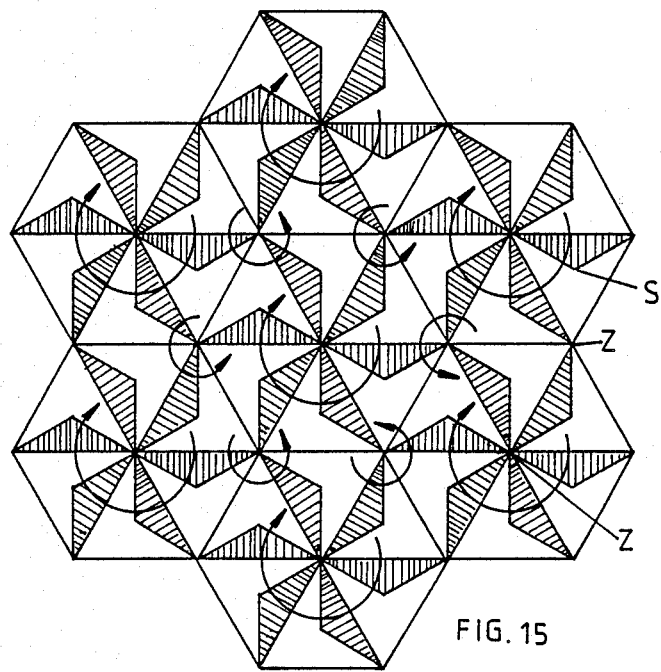
FIG. 15 is a top view of a further embodiment based on equilateral triangle in a reticular arrangement with superimposed triangular pyramids, whereby in each of them only one lateral surface (shown in broken lines) remains closed.

Instead of the squares in the representations according to FIG. 2, FIG. 10 and FIG. 11, other simple geometrical figures can constitute a grating plane which is the base structure for the construction of small pyramid-like projections or recesses. FIG. 15 is based on a network of equilateral triangles.

In the top view of FIG. 15, Z marks the corner points of the triangles in the grating plane. S are the apexes of triangular pyramids. They project from the grating level. In FIG. 15 it is shown as an example that only one of three lateral sides sides of the pyramids are closed. If the apexes S of the pyramids project all from the same side of the grating, counterclockwise and clockwise acting vorticity-creating bodies are formed again which, based on the geometrical constellation, have a different influences on the currents in the apparatus.

Successive cross-sectional layers, as shown in FIG. 15, are offset with respect to each other, in order to close the vertical projection surface of the packing. For this, according to the case shown in FIG. 15, at least three layers are required.

The size of one side of the surface element (i.e. triangle, quadrangle, square, hexagon) can be of only a few millimeters (less than 10 mm), in every large column diameters larger sizes can be found, for instance, of 50 mm or more. The height of the pyramid does not have to be established at a certain value. It can be equal to the length of one of the edges of the base.

The possibilities of use for the here-described packings assembled from pyramid-like elements surpass the boundaries of the aforementioned thermal separation processes. The described packings can also be used in mixing processes, which among others, are technically carried out for the intensification of heat exchanges and for the contact between substances participating in reactions.

I claim:

1. A column packing comprising a multiplicity of generally horizontal superposed layers, each of said layers comprising a regular array of pyramids each having an open base lying in a plane common to the bases of the other pyramids of the respective layer and defined by base edges common to adjacent pyramids of the respective layer, each pyramid further having an apex at an adjacent layer and being defined by at least one open side extending from a respective base edge to the respective apex and adjoined by two walls of the respective pyramid extending from respective base edges to the respective apex, each pyramid of a respective layer having at each corner a junction with a plurality of like adjacent pyramids and surrounded by alternating ones of said open sides and closed walls of the adjacent pyramids which are inclined with corresponding orientations to said plane to induce rotation in a fluid passing through the respective layer in a general flow direction perpendicular to said plane, the rotation senses about alternating ones of said junctions of said layer being opposite such that there is generally a vectoral cancellation of the rotations imparted to said fluid while a local vorticity is created at said junctions for mixing of said fluid.

2. The column packing defined in claim 1 wherein each of said bases is a square.

3. The column packing defined in claim 1 wherein each of said bases is a hexagon.

4. The column packing defined in claim 1 wherein each of said bases is a triangle.

5. The column packing defined in claim 1 wherein said walls consist of screens.

6. The column packing defined in claim 1 wherein some of said walls are closed.

7. The column packing defined in claim 1 wherein said walls are corrugated with crests and troughs extending generally parallel to said plane.

* * * * *